INVENTOR
JULES CYPRIEN JOSEPH POUJADE

BY
Watson, Cole, Grindle & Watson
ATTORNEYS

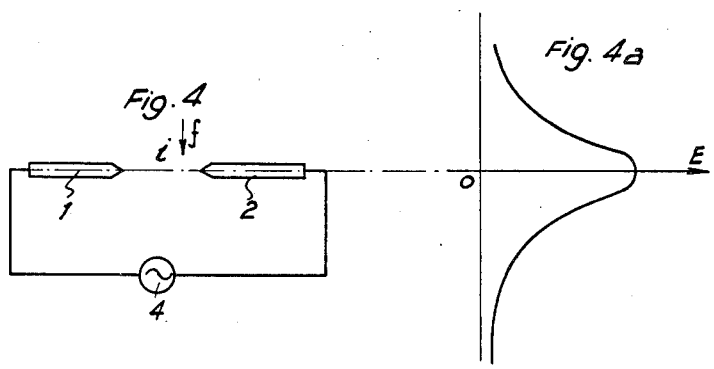
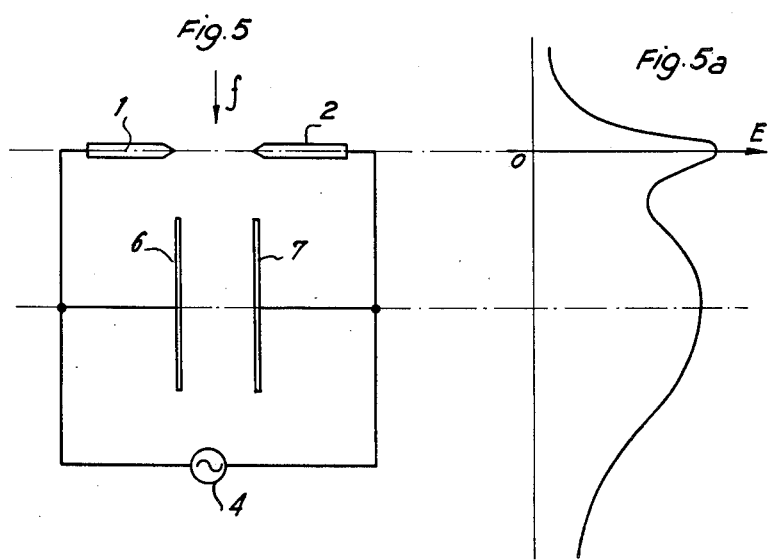

May 22, 1962
J. C. J. POUJADE
3,035,412
COMBUSTION DEVICES, MORE PARTICULARLY FOR CONTINUOUS-FLOW
REACTION PROPULSION UNITS
Filed July 28, 1959
3 Sheets-Sheet 3
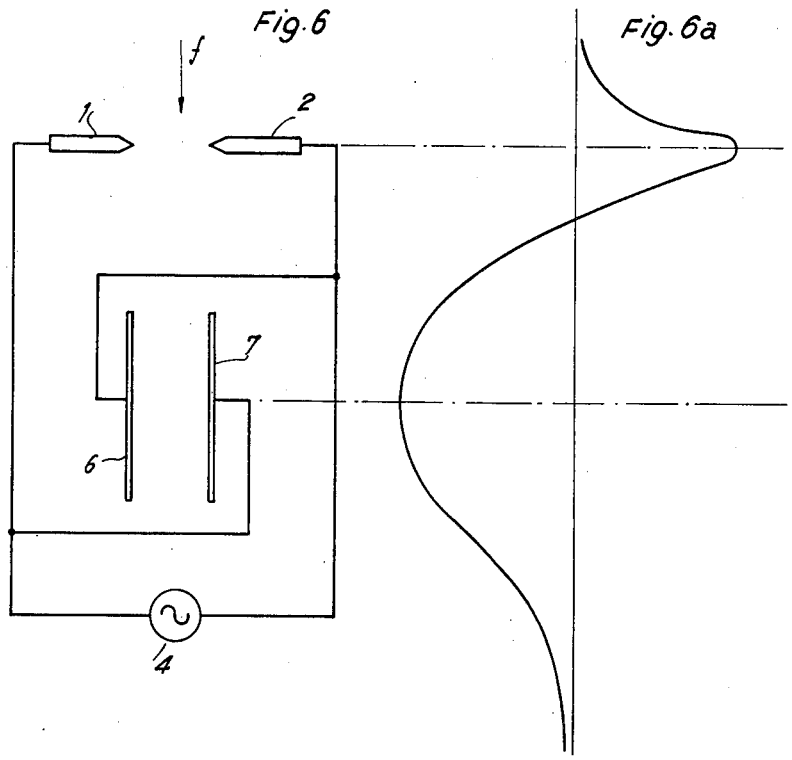
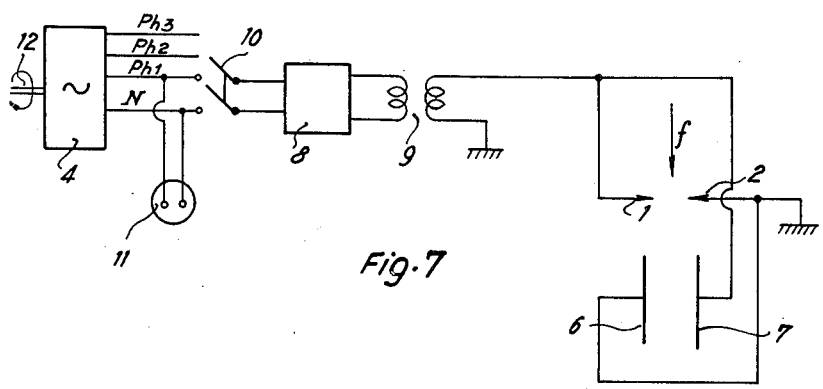
INVENTOR:
JULES CYPRIEN JOSEPH POUJADE
BY:
Watson, Cole, Grindle, & Watson
ATTORNEYS

United States Patent Office 3,035,412
Patented May 22, 1962

3,035,412
COMBUSTION DEVICES, MORE PARTICULARLY FOR CONTINUOUS-FLOW REACTION PROPULSION UNITS
Jules Cyprien Joseph Poujade, Melun, France, assignor to Societe Nationale d'Etude et de Construction de Moteurs d'Aviation, Paris, France, a French company
Filed July 28, 1959, Ser. No. 830,010
Claims priority, application France July 29, 1958
3 Claims. (Cl. 60—39.06)

The object of the present invention is to improve ignition and combustion, or to make ignition and combustion possible, under the most unfavourable conditions—high speed of flow, low pressure, low temperature—which are encountered more and more frequently in proportion as aeronautical technique develops. It is applicable more particularly to combustion or post-combustion in continuous-flow reaction propulsion units through which a carburetted mixture travels at a high speed, for example in the vicinity of Mach 0.5 or above.

According to the present invention, there are created in the path of travel of the carburetted mixture one or more intense electromagnetic fields producing one or more electric discharges by means of electrodes to which is applied a high alternating potential difference. The applicant company has observed that a flow of carburetted mixture thus subjected to an ionisation effect lends itself much more readily to ignition and combustion.

The curves shown in FIG. 1 of the accompanying drawings have been drawn as a result of comparative combustion tests, plotting on ordinates the ratio $Rm$ of the fuel air ratio to the stoichiometric ratio and on abscissae the grouping of variables or flow parameter $Pe$ known as the Zubay-Longweld parameter: $V/p^{0.85} \times T^{1.70} \times D$ where V is the speed of flow (in feet per second), $p$ is the pressure (in pounds per square inch) T is the absolute temperature (in degrees Kelvin) and D is a characteristic dimension of the obstacle (in inches).

The curves I and II represent the stability ranges of conventional combustion, respectively without a flame stabiliser and with a flame stabiliser. Curves III and IV relate to combustion under the same conditions as curves I and II respectively but this time with the application of an electromagnetic field creating an electric discharge.

It will be seen that the stability range is very greatly increased in the case of curves III and IV as compared respectively with curves I and II, and it will be noted also that the poor extinction limit $\alpha$ corresponding to curves I and II disappears, whereas the rich limit $\beta$ is very markedly offset towards higher values of the ratio $Rm$, this being all the more marked in proportion as the flow parameter $Pe$ is greater.

For a given Mach number of the aircraft, the combustion limits depend on the altitude, the latter acting chiefly in the form of the pressure in the flow parameter $Pe$. The change in the limits brought about by applying the electric discharge in accordance with the invention increases the operating ceiling of the engine and also permits reduced consumption at cruising speed or during idling. In other words, owing to the present invention it is possible to initiate and maintain combustion under conditions where this would not have been possible previously.

The electrodes which produce the permanent electric discharge according to the present invention could not be compared to the sparking plug currently used for ignition in combustion chambers. The points of the sparking plug are in fact spaced only a few millimetres from one another whereas the spacing of the ionisation electrodes is considerably greater. Furthermore, the spark of the sparking plug comes from a condenser discharge; operation is therefore intermittent (increasingly so in proportion as the energy put into operation at each discharge is greater) and the potential difference, discontinuous in time, exhibits only positive or zero values. On the contrary, the ionisation produced by the electrode according to the present invention is due to an alternating potential difference and is effective in a permanent manner.

It should also be noted that a sparking plug hitherto has been applied only for ignition. The present invention not only ensures ignition but also the maintenance of combustion in a carburetted mixture which is in a condition of permanent flow, owing to the ionisation effect to which it is submitted, even beyond the normal limits of stable combustion.

In actual fact, the conventional ignition of reaction propulsion engines is effected by applying the electric energy of a spark or a resistance to heat the mixture locally up to its spontaneous combustion temperature. In contrast to this, the ionising electrical discharge of the present invention makes it possible to communicate the energy directly to the appropriate molecules so as to dissociate them and make them more active. The ignition of the mixture is therefore effected from these activated elements by a chain reaction. Ignition can therefore be carried out without its being necessary to take a considerable quantity of the carburetted mixture to its spontaneous combustion temperature.

As has been seen hereinbefore, ignition can be effected outside the normal zone of stability. After accidental extinction during flight, the pilot can re-ignite his engine without having to reduce speed and altitude too much. The ionising discharge having produced a flame, the latter reinforces the action due to the discharge and precipitates the ignition process by ionisation produced by the chemical reactions.

The following description with reference to the accompanying drawings, which are given by way of non-limitative example, will make it readily understood how the invention can be carried into effect, any feature brought out either from the text or from the drawings being understood to form part of the said invention.

FIG. 4 is a diagrammatic view of a pair of electrodes with pointed ends and situated opposite one another, and FIG. 4a shows the variation of the electric field produced by such electrodes, at a given instant.

FIGS. 5 and 5a are similar views to the preceding views, in an arrangement comprising a pair of pointed electrodes followed by a pair of plates, the electrode and plate situated at one and the same side having the same momentary polarity.

FIGS. 6 and 6a are similar to FIGS. 5 and 5a apart from the difference that the momentary polarities of the electrode and the plate situated at one and the same side are opposite to one another.

FIG. 7 shows an electric circuit arrangement which applies to the latter case.

Figure 1:
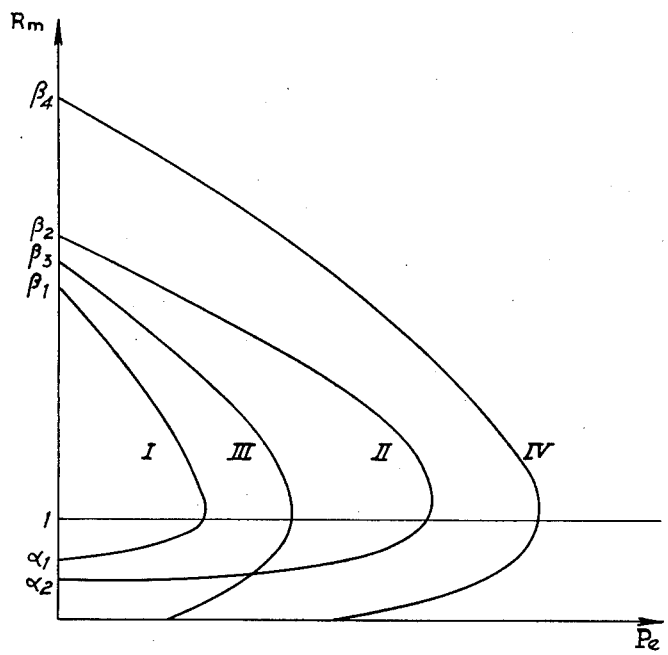
FIG. 1 shows the curves already commented on in the preamble to the specification.
Figure 3:
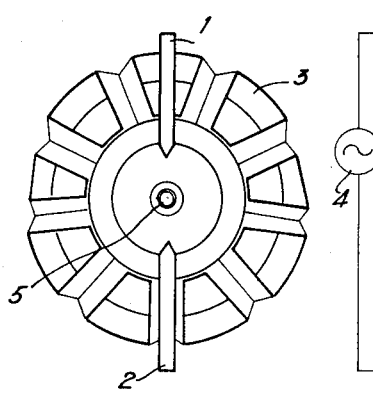
FIG. 3 is a view in the direction of the arrow A of FIG. 2.
Figure 2:
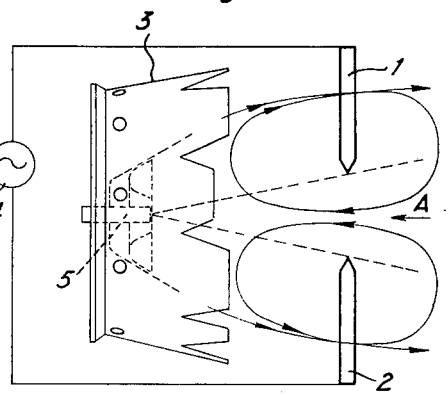
FIG. 2 shows the arrangement of electrodes downstream of a burner, in a combustion chamber of a reaction propulsion unit.

FIGS. 2 and 3 show the arrangement of two electrodes 1, 2 to which is connected an alternator 4, these electrodes producing an ionisation in the turbulence or return zone of a burner 3 of a type currently used in combustion chambers of turbo-jet engines and whose fuel injector is shown at 5.

FIGS. 4 and 4a illustrate the distribution in space of the electric field E, the latter being of course more intense in the gap $i$ between the electrodes 1 and 2.

These electrodes are given the form of small sticks terminating in opposed points. This form of electrode is particularly suitable for ignition since it makes it possible to dissipate a great energy in a small space. However, by combining electrodes of different forms, it is possible to bring about in space any desired distribution of the electric field making it possible to subject the particles of the mixture to a bombardment adapted for the continuous or intermittent production of activated free radicals. Thus, the combustion or post-combustion electrodes will advantageously be constituted of plates 6, 7 (FIGS. 5 and 6) having an appreciable surface area, which are parallel to the direction of flow $f$ and situated downstream of the pointed ignition electrodes 1, 2; these plates 6, 7 will affect a considerable quantity of the mixture to be burned.

The plates 6, 7 can be connected to the alternator 4 in such a manner as to have the same momentary polarity as the ignition electrodes 1, 2 situated at the same side of the flow, as shown in FIG. 5, but it will be preferable to give them opposite polarities as shown in the arrangement of FIG. 6.

Such reversal of polarity has two advantages: on the one hand the energy of the charged particles already produced is utilised to the maximum and on the other hand the speed spectrum of the charged particles is adapted for the purpose of producing activated elements.

These two advantages can be explained as follows:

(a) Under the action of the electronic bombardment, the electrode brought to a positive potential emits electrons the number of which is greater than the number of incident electrons when the energy of the latter is sufficient. The space charge thus created annuls or considerably reduces the value of the electric field produced by the electrodes; consequently, the electrons produced by the bombardment will have transverse speeds with respect to the very slight flow and will be entrained by the gas stream.

In cases where the plate situated downstream of a pointed electrode is also subjected to a positive potential, the electrons emitted by the positive electrode will be under the same conditions as in the preceding case and will participate neither in the ionisation nor in the dissociation of the molecules. It is to be noted that for a flow at a speed of Mach 0.5, a neutral or non-accelerated particle travels over approximately 40 centimetres in the case of a 400 cycle current and 3 metres in the case of a 50 cycle current before the polarity of the plates and of the electrodes is reversed.

On the contrary, if the polarities of the pointed electrode 1, 2 and of the plate 6, 7 situated in its wake are opposite to one another, the electrons taken from the positive electrode and entrained by the gas flow will be repelled by the negative plate and can thus participate once more in the ionisation and in the production of free radicals.

(b) The necessary energy for activation of a molecule of fuel and combustion-supporting agent being very small (in the neighbourhood of 3 eV), it is advantageous to try and obtain corresponding kinetic energies of charged particles. Now, the potentials used to produce the discharge and maintain the ionisation communicate to the electrons too great energy, going as far as to produce the complete dissociation of the molecules of the combustion products.

By reversing the electrode-plate polarity, the direction of the electric field responsible for the acceleration of the charged particles is reversed at one point. The energies acquired by these particles between two molecular impacts therefore will diminish, pass through a value equal to that of the activation energy, will be annulled at a value of the electric field near to zero, and then will increase after having changed direction and will once more pass through the molecule activation energy.

FIG. 7 shows by way of example an electric circuit arrangement for supplying electrodes and plates of opposite polarity.

The alternating potential difference available on the aircraft (for example 120 volts, three-phase, 400 cycles) is controlled by a regulator 8 connected to a transformer 9. The potential difference, of the order of 20 kilovolts, which issues from the secondary winding of the transformer 9, is applied to the pointed electrodes 1, 2 and the plates 6, 7 in accordance with the polarity reversing arrangement of FIG. 6, and the current return can be through earth.

10 designates a control switch whereby the ignition circuit can be connected between one of the phases $Ph1$ and the neutral N of the alternator 4. The two other phases $Ph2$ and $Ph3$ can be allotted to the supply of an equal number of electrodes in order to equilibrate the phases. It is also possible to connect all the electrodes to the same phase and reserve the two others for various uses. A current take-off 11 makes is possible to connect-up an auxiliary source for ignition on the ground when starting up the turbo-jet engine. In the case of accidental extinction during flight, the alternator 4 which is coupled to the shaft 12 of the engine is driven by the rotor of the compressor turning in auto-rotation and can therefore effect the re-ignition of the engine.

It will be apparent that modifications can be made to the forms of embodiment which have just been described, more particularly by substitution of equivalent technical means, without however departing from the scope of the present invention.

It will be apparent, more particularly, that it is possible to use any desired form of electrode which is appropriate to the end in view. Furthermore it is possible to conceive of chambers without solid flame-stabilising screens, the electrodes being sheltered behind fluid screens. If the potential difference is sufficient, it is also possible to conceive of chambers which are only provided with electrodes without stabilisers of any kind. The pressure drop in such a chamber is reduced and its volume can be smaller.

The regulation of the potential difference is not indispensable. If it exists, it can be based on the most appropriate parameters of the engine, for example: the delivery pressure of the compressor, the richness of the mixture, the altitude of the aircraft, the temperature of the gases.

The advantages and modes of application of the invention in post-combustion do not differ essentially from those valid in the case of combustion. Electrodes of different forms can be used alone or combined with mechanical or fluid stabilisers. The potential differences can be less high, the reactions being initiated more easily owing to the high temperature of the gases and the already considerable proportion of ions which they contain.

What we claim is:

1. A combustion device for an airplane jet engine comprising an air inlet, a burner in the air flow having a fuel injector adapted to carburet the said air, at least two pairs of opposing electrodes placed in the path of the carbureted mixture downstream from said burner, the first and the second of said pairs of electrodes being spaced along the flow, the first pair of electrodes having ends of point shape while the second pair of electrodes, arranged downstream of the first, is in the form of plates, the respective electrodes of each pair of electrodes being separated by a substantial spacing, and an alternating high voltage source connected to said respective electrodes of each pair of electrodes.

2. Device according to claim 1 in which the point-shaped electrode and the plate-shaped electrode located on the same side of the flow of the carbureted mixture are connected to the same terminal of the source of voltage.

3. Device according to claim 1 in which the point-shaped electrode and the plate-shaped electrode located on the same side of the flow of the carbureted mixture, are connected respectively to the two terminals of opposite polarity of the source of voltage.

References Cited in the file of this patent

UNITED STATES PATENTS

| | | |
|---|---|---|
| 2,689,457 | Kruppe | Sept. 21, 1954 |
| 2,725,718 | Sheets et al. | Dec. 6, 1955 |
| 2,766,582 | Smith | Oct. 16, 1956 |

FOREIGN PATENTS

| | | |
|---|---|---|
| 669,687 | Germany | Jan. 2, 1939 |